United States Patent [19]

Sakaguchi

[11] Patent Number: 4,829,853

[45] Date of Patent: May 16, 1989

[54] HYDRAULIC CONTROL SYSTEM FOR AUTOMATIC TRANSMISSION

[75] Inventor: Yoshikazu Sakaguchi, Anjo, Japan

[73] Assignee: Aisin-Warner Kabushiki Kaisha, Anjo, Japan

[21] Appl. No.: 127,357

[22] Filed: Dec. 1, 1987

[30] Foreign Application Priority Data

Apr. 9, 1987 [JP] Japan .................................. 62-87448

[51] Int. Cl.$^4$ ................................................ B60K 41/16
[52] U.S. Cl. ......................................... 74/869; 74/868
[58] Field of Search ................................... 74/868, 869

[56] References Cited

U.S. PATENT DOCUMENTS

| | | | |
|---|---|---|---|
| 3,225,619 | 12/1965 | Schaefer | 74/868 |
| 4,274,307 | 6/1981 | Iwanaga et al. | 74/869 |
| 4,474,084 | 10/1984 | Sugano et al. | 74/869 |
| 4,481,877 | 11/1984 | Takano et al. | 74/869 X |
| 4,501,175 | 2/1985 | Tatsumi | 74/869 |
| 4,727,774 | 3/1988 | Sumiya et al. | 74/869 X |

*Primary Examiner*—Dirk Wright
*Attorney, Agent, or Firm*—Frank J. Jordan; C. Bruce Hamburg; Manabu Kanesaka

[57] ABSTRACT

Under idle condition of a vehicle, control valve 90 is "left half position", line pressure modulated by throttle valve 41 is applied to clutch hydraulic servo $C_1$ through ports $\delta$, $\mu$; and the clutch is held just under connection, line pressure is applied to brake hydraulic servo $B_1$ through shift valve 52 being under low speed condition;

in case of high speed running, shift valve 52 is "left half position", so that line pressure is not applied to brake hydraulic servo $B_1$;

when a vehicle starting, control valve 90 becomes "right half position", then, line pressure is applied to clutch hydraulic servo $C_1$ through ports $\alpha$, $\mu$ and port $\beta$ is drained;

in case of high speed coasting, control valve becomes "left half position", line pressure is not applied to clutch hydraulic servo $C_1$;

in case of speed higher than certain level, if a manual valve being shifted to R range, control valve 90 becomes "left half position" and ports $\epsilon$, $\eta$ are disconnected;

due to the above, creeping is avoided, hill-hold mechanism works, shift shock when clutch is connected is eliminated, engine braking under high speed coasting is avoided, and shifting to R range when running forward is avoided.

4 Claims, 5 Drawing Sheets

FIG.4

| POSITION | | CLUTCH | | | BRAKE | | | | O.W.C | | | SOLENOID | | | |
|---|---|---|---|---|---|---|---|---|---|---|---|---|---|---|---|
| | | $C_0$ | $C_1$ | $C_2$ | $B_0$ | $B_1$ | $B_2$ | $B_3$ | $F_0$ | $F_1$ | $F_2$ | $S_1$ | $S_2$ | $S_L$ | $S_c$ |
| P | STOP | ○ | | | | | | | | | | ○ | | | |
| R | RUN | ○ | | ○ | | | | ○ | | | | ○ | | | ○ |
| N | STOP | ○ | △ | | | | | | | | | ○ | | | |
| D | 1st | ○ | △ | | | ○ | | | ○ | | | ○ | | | ○ |
| | 2nd | ○ | ○ | | | | ○ | | ○ | ○ | | ○ | ○ | ◉ | |
| | 3rd | ○ | ○ | ○ | | | ○ | | ○ | | | | ○ | ◉ | |
| | O/D | | ○ | ○ | ○ | | ○ | | | | | | | ◉ | |
| | COASTING | ○ | △ | ○ | ○ | | | | | | | | | ◉ | |
| S | 1st | ○ | ○ | | | ○ | | | ○ | ○ | | ○ | ○ | | |
| | 2nd | ○ | ○ | | | ○ | ○ | | ○ | ○ | | ○ | ○ | | |
| | 3rd | ○ | ○ | ○ | | | ○ | | ○ | | ○ | | | | |
| L | 1st | ○ | ○ | | | ○ | | ○ | ○ | ○ | | ○ | ○ | | |
| | 2nd | ○ | ○ | | | ○ | ○ | | ○ | ○ | ○ | ○ | ○ | | |

| REMARKS | | |
|---|---|---|
| ○ | SUPPLY | MOTION | ON |
| | RELEASE | NO MOTION | OFF |
| △ | PRESSURE REDUCTION | | |
| ◉ | | | MOTION IN SUITABLE MOMENT |

HYDRAULIC CONTROL SYSTEM FOR AUTOMATIC TRANSMISSION

BACKGROUND OF THE INVENTION

1. Field of the Invention

The present invention relates to a hydraulic control circuit for an automatic transmission, particularly to a hydraulic control system having a neutral control for a hill-holding stop position a neutral control for high speed coasting, and a protective control against reverse.

2. Description of Prior Art

An automatic transmission, in general, causes creeping which makes an automobile run forward due to the so called "dragging torque" of a torque converter in case that an automobile is stopped by a manual valve in the D range. A driver usually needs to step on a brake during the entire time an automobile stops.

Under such circumstances, a control device has been proposed to avoid creeping from low torque in the high speed range which is automatically shifted when an automobile stops, to ease fatigue of the driver and increase fuel efficiency. Another proposed device avoids creeping by disconnecting the forward clutch so that torque is not transmitted to the wheels. On the other hand, shifting to the high speed range can avoid creeping under normal idling condition but still produces creeping at high speed idling during warm-up of the engine.

Furthermore, disconnecting the forward clutch requires an accumulator, modulator valve, solenoid valve and other special equipment to prevent shift-shock when said clutch is connected. Because of the above, the structure becomes complicated and big, the cost of said device increases and problems on reliability occur. In addition, if the forward clutch is disconnected, no restriction exists on the vehicle, so that it may start rolling even on a very small incline. To avoid this, it is desirable for this type of device to incorporate a hill-holding mechanism. However, this results in a more complicated structure.

During high speed coasting where no engine torque is required, when an accelerator is released, an engine brake is applied slightly in the D range. So, to obtain high fuel efficiency, it is desirable to disconnect the clutch automatically during high speed coasting. And incorporating a mechanism which prevents an automatic transmission from going into the reverse condition even when the shift valve is shifted to the R range, particularly when the vehicle is running faster than a certain speed helps enhance safety.

Accordingly, mechanisms for neutral control during high speed coasting and preventing R range shifting due to errors in operation, in addition to mechanisms for anti-creeping and hill-holding, cause "locking" of automatic transmission during high speed running and require actuators and valves to control the system, resulting in diminished reliability, cost increase and an excessively large system.

An object of the present invention is to provide a hydraulic control system for an automatic transmission which has the following features with a very simple structure:

(1) an anti-creeping mechanism;
(2) a hill-holding mechanism;
(3) neutral control during high speed coasting; and
(4) preventing R range shifting during erroneous operation.

SUMMARY OF THE INVENTION

While the invention is believed to be readily understood from the above description, a brief summary will now be set forth.

Explanation will be given in accordance with FIG. 1. In a hydraulic control system for an automatic transmission comprising servos for clutches (C) and brakes (B) which connect or disconnect components of a transmission gear mechanism, and manual valve (40), there is provided modulator valve (41) (electronic throttle valve, as an example) and control valve (90) which is shifted by signals detecting vehicle running condition and position of the manual valve, in the system. Said control valve (90) has the following ports:

first port ($\mu$)—connected to forward clutch hydraulic servo ($C_1$);
second port ($\beta$)—connected to brake hydraulic servo ($B_1$);
third port ($\alpha$)—connected to an oil path provides line pressure; and
fourth port ($\delta$)—connected to modulator valve (41).

Under normal running condition, control valve (90) is arranged so that first port ($\mu$) and third port ($\alpha$) are connected, and second port ($\beta$) is drained. Under the condition of stopping or high speed coasting, control valve (90) is shifted to connect first port ($\mu$) and fourth port ($\delta$), and second port ($\beta$) and third port ($\alpha$).

In oil paths ($\beta_1$) and ($\beta_2$), shift valve (52) (for example a 2-3 shift valve), which does not work under low speed condition, is arranged to connect said oil paths ($\beta_1$) and ($\beta_2$) during low speed running (1st and 2nd speed) and close said oil paths during high speed running (3rd and 4th speed).

Furthermore, addition to the above four ports, in said control valve (90) include sixth port ($\epsilon$) which connects to brake hydraulic servo ($B_3$) functions during reversing through fifth port ($\eta$), wherein line pressure is applied when a manual valve (40) is at R range. If vehicle speed is less than a certain level, said control valve (90) is arranged to connect said ports ($\epsilon$) and ($\eta$). If vehicle speed is above a certain level, control valve (90) closes these ports ($\epsilon$ and $\eta$).

In accordance with the structure explained above, if a vehicle stops to idle at a red signal, etc., under the condition of the manual valve being at D range (or S, L range), solenoid valve (Sc) switches "ON" based on a signal from controller (E), lower oil chamber ($\rho$) of control valve (90) is drained and said valve 90 assumes a "left half position" through the action of spring (91). Then, third port ($\alpha$) is connected to second port ($\beta$), fourth port ($\delta$) (regulating) is connected to first port ($\mu$), modulator valve (41) provides modulating pressure which is just below the pressure needed to work clutch ($C_1$), said pressure is applied to forward clutch hydraulic servo ($C_1$) through port ($\delta$) and ($\mu$), and at the same time, line pressure from manual valve (40) is applied to brake hydraulic servo ($B_1$) through ports ($\alpha$) and ($\beta$) and shift valve (52) which is under low speed condition (right half position). Under this condition, the forward clutch is disconnected. Accordingly, torque is not transmitted, and brake ($B_1$) is applied; regression and creeping are avoided, and at this time the hill-holding mechanism also works.

When a vehicle is stopped, shift valve (52) is in the "right half position", so that oil paths ($\beta_1$) and ($\beta_2$) are connected, but when the vehicle is operating at high speed, a fail-safe mechanism works because said shift valve (52) is in the "left half position", as a result of which oil paths ($\beta_1$) and ($\beta_2$) are disconnected even though control valve (90) is mistakenly connected to port ($\beta$).

When shift valve (90) is switched to the "right half position" in accordance with receipt of a running signal from controller (E), line pressure port ($\alpha$) is changed to ($\mu$), and port ($\beta$) is changed to drain port (d). The pressure of forward clutch (C1) recedes to line pressure level, said clutch ($C_1$) is connected smoothly, brake ($B_1$) is released, and then the vehicle moves forward.

In high speed running in D range, if a vehicle is under "high speed coasting" after releasing the accelerator, said shift valve (90) takes the "left half position" in response to signals from controller (E).

Under this condition, modulator pressure port ($\alpha$) and port ($\mu$) are connected, and the forward clutch is disconnected so that the engine brake is not applied. At this time, line pressure port ($\alpha$) and port ($\beta$) are connected and line pressure is applied to oil path ($\beta_1$). However, shift valve (52) is in the "left half position", so that line pressure is not applied to brake hydraulic servo ($B_1$).

Furthermore, at speeds above a certain level, if manual valve (40) is shifted to the R range, control valve (90) takes the "left half position". Then, port ($\epsilon$) and ($\eta$) are disconnected, so that line pressure is not applied to reverse brake hydraulic servo (B3) through reverse port (r) of manual valve (40).

In addition to the above, another fail-safe system is suggested, as shown by the dotted line in FIG. 1. Specifically, oil paths ($\beta'_2$) instead of ($\beta_2$) and ($\beta'_3$) instead of ($\beta_3$) are led to shift valve (51).

All numbers in parentheses in the "summary of the invention" are for reference purposes only and do not define the present invention.

BRIEF DESCRIPTION OF THE DRAWINGS

FIG. 4 is a table of operation; and

DESCRIPTION OF THE PREFERRED EMBODIMENTS

Figure 2:
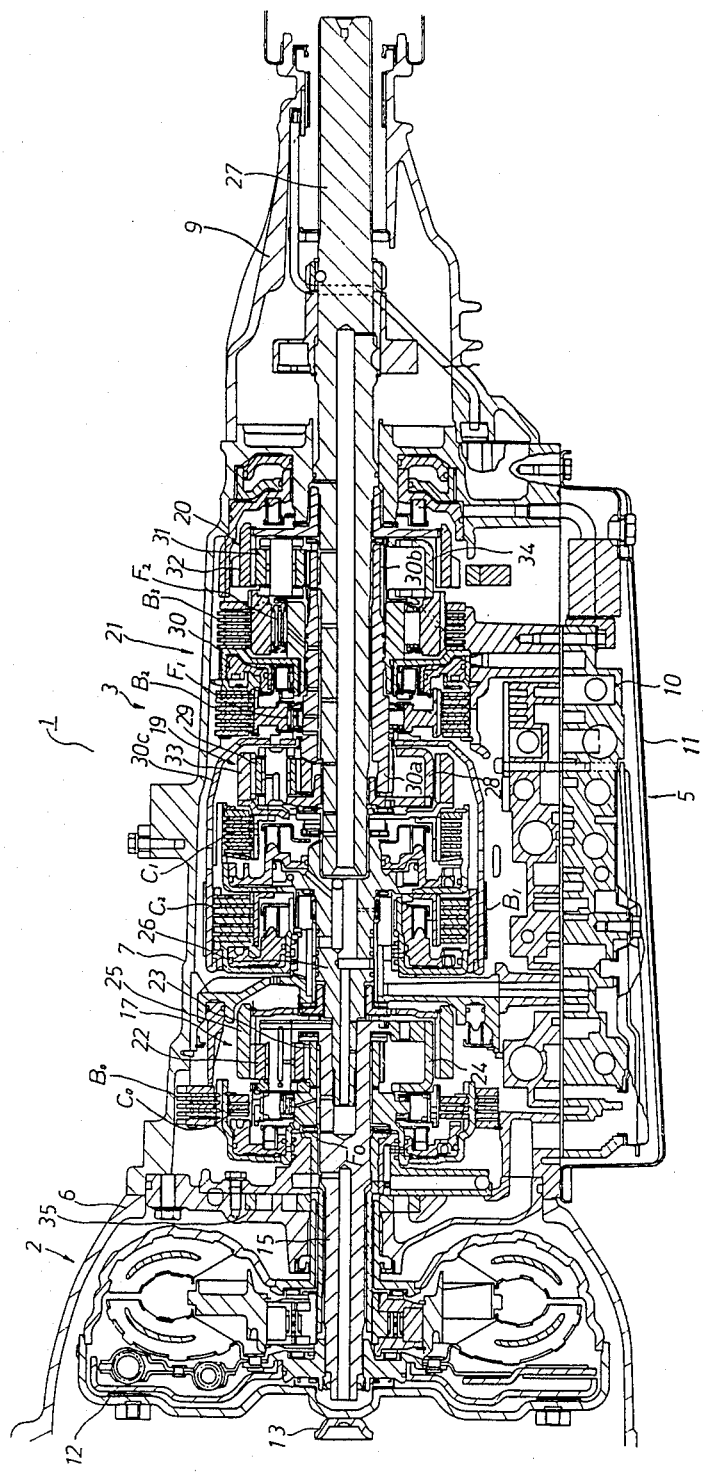
FIG. 2 is an overall cross sectional view of an automatic transmission employing the present invention.

Explanation is given in accordance with the drawings. As shown in FIG. 2, an automatic transmission 1 comprises torque converter 2, planetary transmission gear mechanism 3 and hydraulic control system 5 contained in converter housing 6, transmission case 7, extension housing 9, valve body 10 and oil pan 11 respectively.

Torque converter 2 having lock-up clutch 12 transmits the rotation of input shaft 13 to input shaft 15 of transmission gear mechanism 3 through oil flow in said converter 2 or directly through said lock-up clutch 12.

Transmission gear mechanism 3 includes main transmission unit 21 comprising over-drive planetary gear unit 17, front planetary gear unit 19 and rear planetary gear unit 20.

Over-Drive planetary gear unit 17 comprises carrier 24 directly connected to input shaft 15 and supporting planetary gear 22, sun gear 23 situated outside input shaft 15 and ring gear 25 coupled to input shaft 26 of main transmission unit 21. Over-Drive direct clutch $C_0$ and one-way clutch $F_0$ are laid between carrier 24 and sun gear 23. Over-Drive Brake $B_0$ is laid between sun gear 23 and case 7.

Front planetary gear unit 19 comprises carrier 28 directly connected to output shaft 27 and supporting planetary gear 29, sun gear 30a which is situated outside the output shaft and embodied with sun gear 30b of rear planetary gear unit 20, and ring gear 33 coupled with input shaft 26 through forward clutch $C_1$. Direct clutch C2 is laid between input shaft 26 and sun gear 30. Second coast brake B1 is laid between said sun gear 30 and case 7. Second brake B2 is laid between sun gear 30 and case 7 through one-way clutch $F_1$.

Rear planetary gear unit 20 comprises carrier 34 supporting planetary gear 31, sun gear 30b and ring gear 32 directly connected with output shaft 27. First and reverse brake B3 and one-way clutch F2 are laid parallel between carrier 34 and case 7. Number 35 in FIG. 2 is an oil pump.

Figure 3:
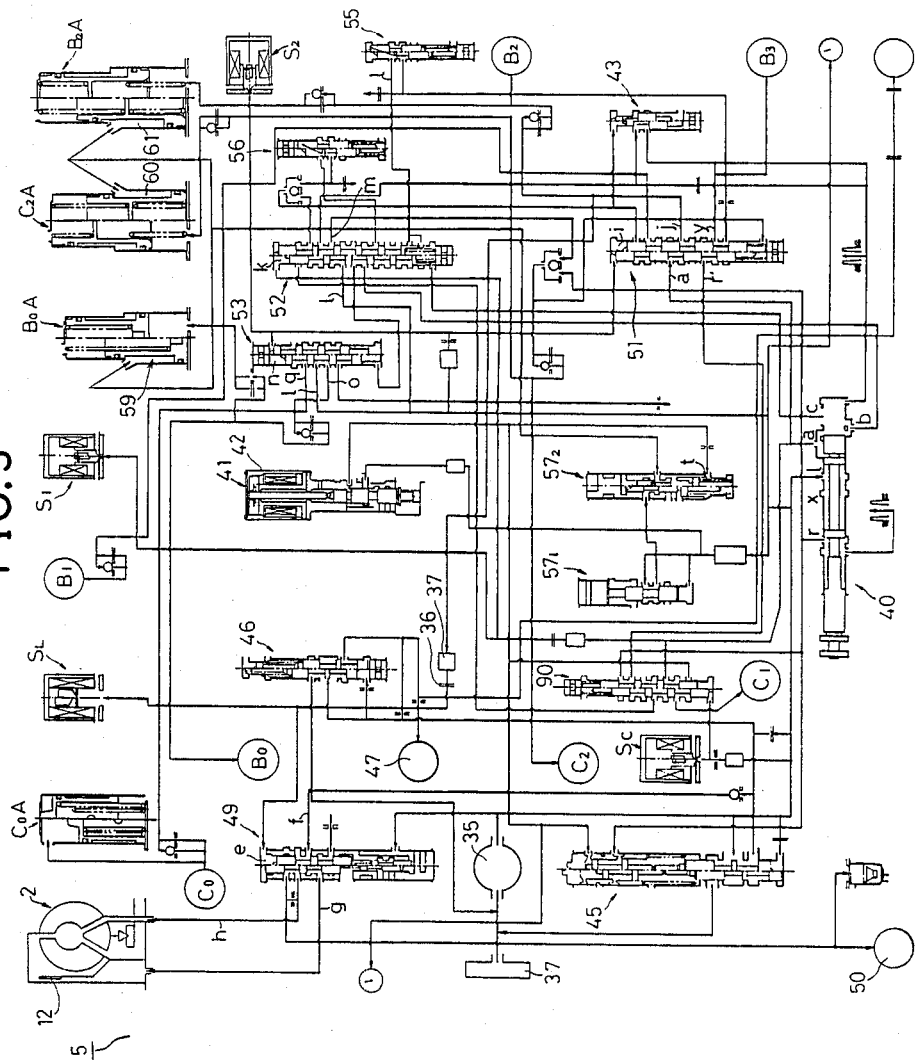
FIG. 3 is an overall schematic view of a hydraulic control system.

On the other hand, an hydraulic transmission control system, as shown in FIG. 3, comprises a multiplicity of valves, accumulators, orifices and strainers, etc.

Figure 1:
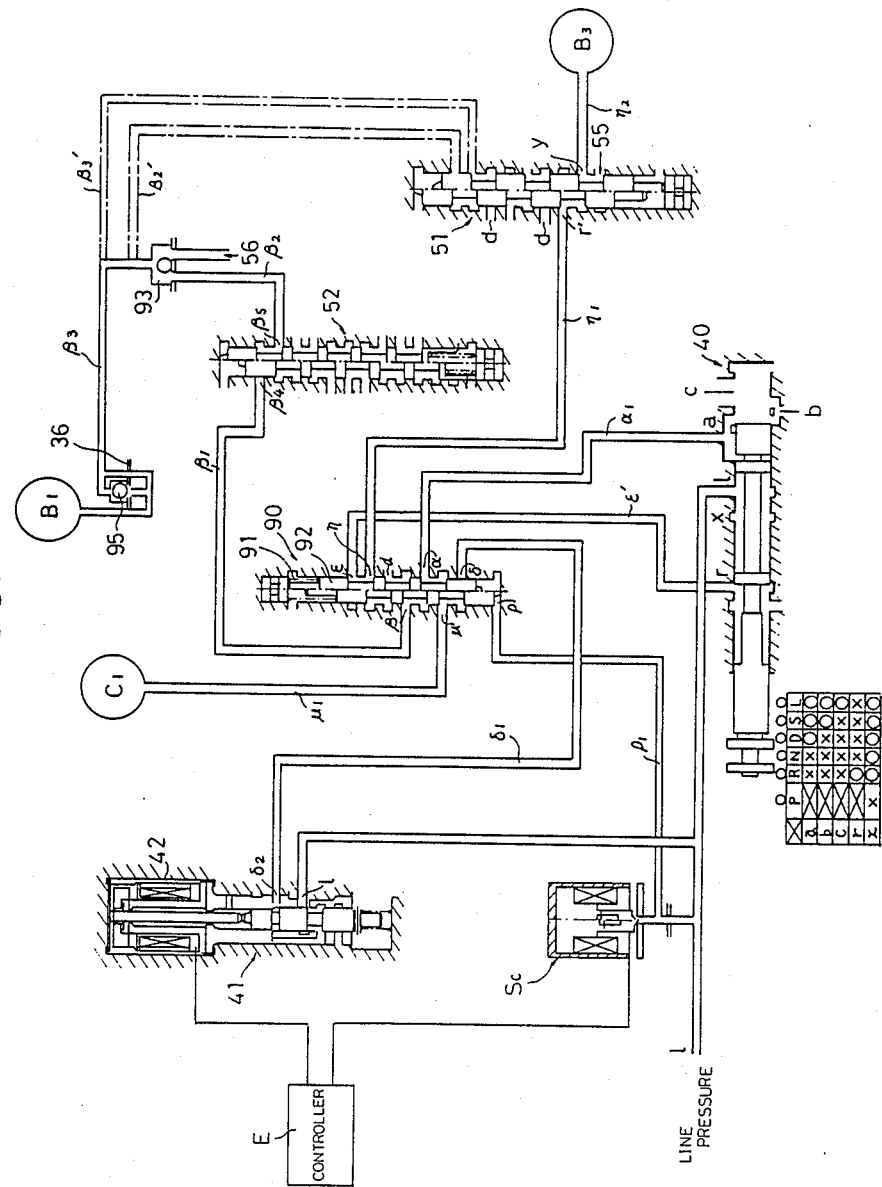
FIG. 1 is a schematic view of a main portion of the present invention.

Manual valve 40 is changed in position (P, R, D, S, L) by a shift lever and, as shown in FIG. 1, line pressure is exerted through each path (a, b, c, r, x) in accordance with shift lever position.

Primary regulator valve 45 provides line pressure by regulating throttle pressure corresponding to load. In case of high load, line pressure is increased to secure the motion of clutch hydraulic servo C, and brake hydraulic servo B. To the contrary, in case of low load, line pressure is regulated to a lower level.

Secondary regulator valve 46 is regulated by line pressure from primary regulator valve 45, and controls line pressure for converter and rublicated portions.

Lock-up relay valve 49 controlled by solenoid valve SL changes oil flow to lock-up clutch 12 and oil collar 50. When solenoid valve SL is "ON", line pressure is applied to upper oil chamber "e", then, oil path "g" for lock-up clutch "OFF" is switched to oil path "h" for lock-up clutch "ON", and oil path "g" is led to drain port.

Shift valve 51, switching 1st and 2nd speeds of main transmission unit 21, is controlled by solenoid valve S2. When solenoid valve S2 is "OFF", line pressure is applied to oil chamber "i"; said valve 51 closes oil path "a" at D, S, L ranges of manual valve 40, and closes oil path "r" at R range of manual valve 40. On the other hand, when solenoid valve $S_2$ is "ON", oil paths "a" and "j", "y" and "y" are connected so that line pressure is applied to brake B2, and accumulator B2A or brake B3.

Shift valve 52 switches 2nd and 3rd speeds of main transmission unit 21, and is controlled by solenoid valve S1. When solenoid valve S1 is "OFF", line pressure is applied to oil chamber "k", and line pressure in oil path "l" is connected to oil path "m" to apply line pressure to direct clutch C2 and its accumulator C2A. When solenoid valve S1 is "ON", said path "l" and "m" are disconnected.

Shift valve 53 switches over-drive unit 17, and is controlled by solenoid valve S2. When solenoid valve S2 is "OFF", line pressure is applied to and oil chamber "n", oil path "1" is connected to oil path "o" to apply line pressure to over drive brake $B_0$ and its accumulator $B_0A$. When solenoid valve S2 is "ON", oil path "l" is connected to oil path "q" to apply pressure to over drive direct clutch $C_0$ and its accumulator $C_0A$.

Low coast modulator valve 55, at L range of said manual valve 40, adjusts line pressure of oil path "l" applied from port "c" through shift valve 52 to low coast modulator pressure, and applies low coast modulator pressure to 1st and reverse brake B3 through shift valve 51.

Second coast modulator valve 56, at S range of said manual valve 40, adjusts line pressure, applied from port "b", through shift valve 52 and shift valve 51, to low coast modulator pressure, and applies low coast modulator pressure to 2nd coast brake B1.

First and second accumulator control valves 57-1 and 57-2 adjust line pressure to accumulator control pressure by applying throttle pressure to oil chamber "t", and apply said accumulator control pressure to back pressure chambers 59, 60, 61 of each accumulator $B_0A$, $C_2A$, and $B_2A$.

In addition to the above hydraulic devices, said hydraulic transmission control system 5 has throttle valve 41, release control valve 43, control valve 90 which relates to the present invention, and solenoid valve Sc to control said control valve 90.

Control valve 90, as shown in FIG. 1, has spool 92 attached to spring 91, oil chamber $\rho$ at the opposite side of said spring 91, ports ($\mu$, $\beta$, $\alpha$, $\delta$, $\epsilon$, $\eta$) and drain port d. Oil chamber $\rho$ is connected to solenoid valve Sc, and said valve Sc is on/off controlled by a signal based on running condition from controller E and position of the shift valve. First port $\mu$ is connected to forward clutch C1 through oil path $\mu_1$, while second port $\beta$ is connected to port $\beta_4$ of shift valve 52 through oil path $\beta_1$. Said valve 52 is shifted at "1st and 2nd speed" (low speed position—right half position), and "3rd and 4th speed (high speed position—left half position). Said port $\beta_4$ is connected to port $\beta_5$ at low speed position, port $\beta_5$ is connected to 2nd coast brake B1 through oil path $\beta_2$, switching valve 93, oil path $\beta_3$, and orifice 36. Said port $\beta_5$ is closed at high speed position. Check valve 95 which allows oil flow from brake B1 to oil path $\beta_3$ is laid parallel with orifice 36. Third port $\alpha$ is connected to port "a" which line pressure is applied at D, S, L range of manual valve 40 through oil path $\alpha_1$. Fourth port $\delta$ is connected to regulating port $\delta_2$ of throttle valve 41 through oil path $\delta_1$. Fifth port "$\epsilon$" is connected to port "r" which line pressure is applied at R range of manual valve 40. Sixth port "$\eta$" is connected to port "r'" of shift valve 51 through oil path $\eta-1$. Shift valve 51 is positioned in the "left half position" at 2nd, 3rd, 4th speed and R range, and shifted to the "right half position" at 1st speed range, then, port r' is closed. Said valve 51 applies modulator pressure from low coast modulator valve 55 to port "y", connects ports r' and "y" in the "left half position", and applies line pressure from oil path $\eta_1$ to 1st and reverse brake B3 through oil path $\eta_2$.

Throttle valve 41 comprising an electronics throttle valve controlled by linear solenoid valve 42, is controlled by signals from controller E based on position of the shift valve, opening of the throttle valve, running condition, etc., and applies modulator pressure from port $\delta_2$ by adjusting line pressure of port "l".

Solenoid valves S1, S2, S3, SL, SC, clutches Co, C1, C2, brakes Bo, B1, B3, one-way clutches Fo, F1, F2, and the positions of manual valve 40 (P, R, N, D, S, L) in automatic transmission 1 are controlled as shown in the operation table of FIG. 4.

Figure 5:
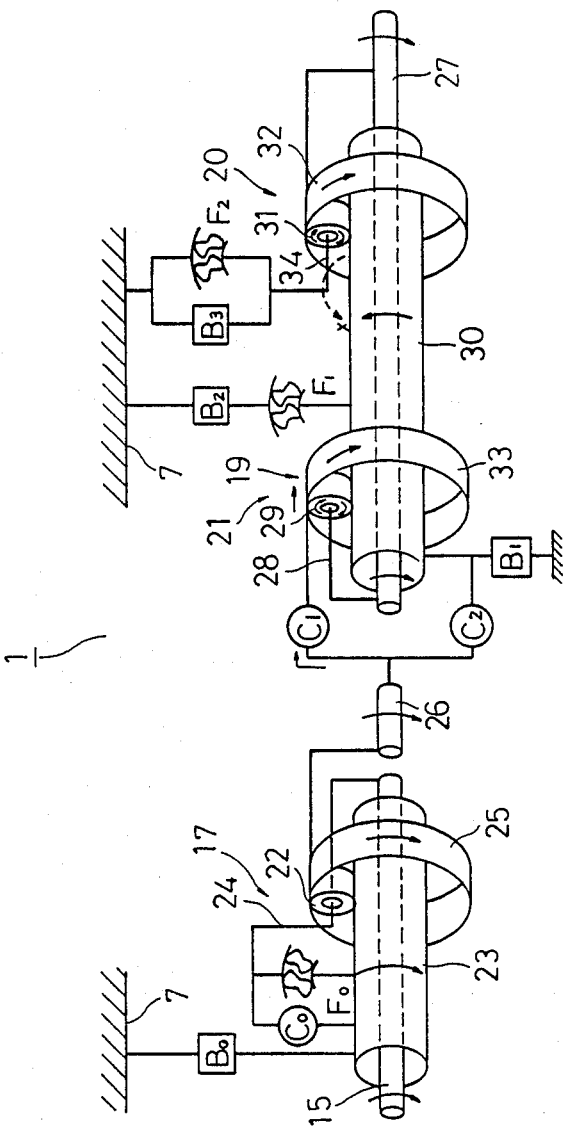
FIG. 5 is a schematic view of an automatic transmission.

At 1st speed of D or S range, over-drive direct clutch Co, one-way clutch Fo, F2 and forward clutch C1 are connected, while others are released. Consequently, (refer to FIG. 5), over-drive unit 17 and planetary gear unit 22 are directly connected through clutch Co and one-way clutch Fo, so, rotation of input shaft 15 is transmitted to input shaft 26 of main transmission unit 21 without changing speed. In main transmission unit 21, the rotation of input shaft 26 is transmitted to ring gear 33 of front planetary gear unit 19 through clutch C1, output shaft 27 to which carrier 28 is coaxially fixed, and carrier 34 of rear planetary gear unit 20 through sun gear 30. However, said carrier 34 is stopped by one-way clutch F2, while planetary gear 31 self rotates and transmits torque to ring gear 32 which is coaxially fixed with said output shaft 27. At this time, in main transmission unit 21, there are two transmission routes, from front planetary gear unit 19 to output shaft 27, or from rear planetary gear unit 20 to output shaft 27, to decrease the load which the gears receive.

At 2nd speed of D range, over-drive clutch Co, one-way clutch Fo, forward clutch C1, one-way clutch F1 and 2nd brake B2 are connected, while others are released. Over-drive unit 17 is in the direct coupling condition, and the rotation of input shaft 15 is transmitted directly to input shaft 26 of main transmission unit 21. In said main transmission unit 21, the rotation of input shaft 26 is transmitted to ring gear 33 of front gear unit 19 through clutch C1, and sun gear 30 through planetary gear 30. However, said sun gear 30 is stopped by one-way clutch F1. Then, said gear 29 self rotates and carrier 28 also rotates, and 2nd speed is transmitted to output shaft 27 only through front gear unit 19.

At 3rd speed of D range, over-drive clutch Co, one-way clutch Fo, forward clutch C1, direct clutch C2 and 2nd brake B2 are connected, while others are released. Over drive unit 17 is under direct coupling condition. In main transmission unit 21, front planetary gear unit 19 works as one body because clutch C1 and C2 are connected, and the rotation of input shaft 26 is transmitted directly to output shaft 27.

At over drive of D range, over-drive brake Bo, forward clutch C1, direct clutch C2 and 2nd brake B2 are connected and others are released. Consequently, in over drive unit 17, sun gear 30 is locked by brake Bo, and carrier 24 rotates, while planetary gear 22 self rotates, transmits torque to ring gear 25 and also transmits increased rotation to input shaft 26 of main transmission unit 21. In addition, said main transmission unit 21 is under "direct coupling", and the over-drive condition is obtained, as a whole, by combination of said units 16 and 21.

At 1st, 2nd, 3rd, and over-drive of D range, for a running vehicle, solenoid valve So is "OFF", and control valve 90 is in the "right half position" through line pressure being applied to lower oil chamber $\rho$. In this condition, line pressure from port "a" of manual valve 40 is applied to forward clutch C1 through ports $\alpha$ and $\mu$, and port $\delta$ is closed.

In D range, if a vehicle stops and idles, solenoid valve $S_c$ is "ON" in accordance with signals from controller E. Then, lower oil chamber $\rho$ of control valve 90 is released, and valve 90 assumes the "left half position". In this condition, ports $\delta$ and $\mu$, $\alpha$ and $\beta$ are connected, modulator pressure from port $\delta_2$ of throttle valve 41 is applied to forward clutch C1 through oil paths $\delta_1$ and $\mu_1$, and line pressure from port "a" of manual valve 40 is applied to port $\beta_4$ of shift valve 52 through oil paths $\alpha_1$ and $\beta_1$. At this time, linear solenoid valve 42 is controlled by signals from controller E, forward clutch C1 is connected so that pressure attains just below that for torque transmission and said modulator pressure is applied to clutch hydraulic servo C1 to place clutch C1 in a condition just short of torque transmission.

On the other hand, when a vehicle stops, shift valve 52 is in the "right half position", ports $\beta_4$ and $\beta_5$ are connected, and line pressure at said port $\beta_4$ is applied to 2nd coast brake B$_1$ through oil path $\beta_2$, switching valve 93, oil path $\beta_3$ and orifice 36. Due to this motion, forward clutch C$_1$ is released, torque transmission from the engine of the vehicle is disconnected by application of the 2nd coast brake and regression of the vehicle is avoided.

If a start signal is sent based on throttle opening ratio, etc., controller E sends an "OFF" signal to solenoid valve Sc. Then the control valve is shifted to the "right half position", ports $\alpha$ and $\mu$ are connected, port $\delta$ is closed and port $\beta$ is connected to drain port "d". Under this condition, shift valve 52 is at 1st speed, and line pressure in the second coast brake hydraulic servo is drained to drain port "d" through check valve 95, oil path $\beta_3$, port $\beta_5$, $\beta_4$, oil path $\beta_1$ and port $\beta$. Line pressure at port "a" of manual valve 40 is applied to forward clutch C1 through oil path $\alpha_1$ and $\mu_1$. Then, said clutch C1 which is ready for connection due to modulator pressure is soon connected, so that the vehicle starts moving without shift-shock and with high response.

When the vehicle is running at high speed, if control valve 90 is shifted to the "left half position" by turning to "on" of solenoid valve Sc due to an error signal from controller E, modulator pressure is applied to clutch C$_1$ and line pressure is applied to oil path $\beta_1$ through ports $\alpha$ and $\beta$. However, shift valve 52 is under "left half position", so that port $\beta_4$ is closed. Accordingly, 2nd brake B$_1$ is not connected despite error during operation while high speed running. (Fail-Safe System)

During high speed running at D range, if controler E receives a coasting signal, such as when the throttle opening is zero, said controller E makes solenoid valve SC switch "ON". Control valve 90 is shifted to the "left half position", ports $\alpha$ and $\mu$ are disconnected, and line pressure is not applied to forward clutch C$_1$. Ports $\delta$ and $\mu$ are then connected, and modulator pressure from throttle valve 41 is applied to clutch C$_1$. Due to this motion, forward clutch C$_1$ is released, i.e., engine and wheels are disconnected, and the vehicle assumes a coasting condition. At this moment, ports $\alpha$ and $\beta$ are connected, and line pressure is applied to oil path $\beta_1$. However, port $\beta_4$ is closed because shift valve 52 is in the "left half position", whereby line pressure is not applied to 2nd brake B$_1$.

At 2nd speed of S and L ranges, engine braking is possible because 2nd coast brake B$_1$ is connected, whereby the rotation of sun gear 30 is restricted in both directions.

At 1st speed of L range, engine braking is also possible because 1st and reverse brake B$_3$ is applied, whereby rotation of carrier 34 in planetary gear unit 31 is restricted in both directions.

At R range, if the speed of a vehicle is less than a certain level, over-drive clutch C$_0$, direct clutch C$_2$ and 1st and reverse brake B$_3$ are connected, while others are released. Over-drive unit 17 is in a direct coupling condition, and in main transmission 21, the rotation of input shaft 26 is transmitted directly to sun gear 30 through direct clutch C$_2$, and the rotation of said sun gear 30 is transmitted to ring gear 32 as reverse rotation through self-rotation of planetary gear 31 because the rotation of carrier 34 of rear planetary gear unit 20 is locked by brake B$_3$. Accordingly, output shaft 27 rotates reversely. At this moment, solenoid valve Sc is "OFF", control valve 90 is in the "right half position" and port $\epsilon$ and $\rho$ are connected. Line pressure from port "r" of manual valve 40 is applied to port r' of shift valve 51 through oil paths $\epsilon'$ and $\eta'$. Further more, as said shift valve 51 is in the "left half position", line pressure is applied to 1st and reverse brake B$_3$ through ports "y" and oil path $\eta_2$.

On the other hand, if the speed of a vehicle is above a certain level and the shift lever is operated in the R range, manual valve 40 is shifted. At the same moment, solenoid valve Sc switches "ON", and then control valve 90 is changed to the "left half position". Ports $\epsilon$ and $\eta$ are disconnected, line pressure from port "r" is not applied to oil path $\eta_1$, and main transmission unit 21 is protected from the reverse condition by 1st & reverse brake B3. Ports $\alpha$ and $\beta$ are connected. However, line pressure is not applied to port a due to manual valve 40 being shifted to the R range. Line pressure is not applied to 2nd brake B$_1$. The above stated embodiment employs an electronic throttle valve 41 to apply modulator pressure to forward clutch C1. Valve 41 can be replaced by an exclusive modulator valve.

By applying 2nd coast brake B1, only reverse movement of a vehicle is restricted. However, it is possible to restrict reverse and forward movement of a vehicle by using said 2nd coast brake B$_1$1 and 1st and reverse brake B$_3$.

As explained above, the present invention has the following features:

(a) As forward clutch C$_1$ is disconnected to avoid creeping, load is not placed on an engine while a vehicle stops.

(b) Fuel efficiency is enhanced, increase of exhausted gas and vibration are prevented.

(c) Only installation of control valve 90 makes the system as minimum and simple as possible.

(d) As forward clutch C$_1$ is connected to its hydraulic servo and applies modulator pressure which is just below the pressure level necessary to transmit torque, shift-shock and response delay at starting are avoided.

(e) Brake B$_1$ is applied while stopping, whereby a vehicle is under hill-holding stop condition.

(f) Even though control valve is mistakenly operated, brake B$_1$ is not applied (fail-safe system) because shift valve 52 which does not work at low speed condition is laid between oil paths $\beta_1$ and $\beta_2$.

(g) During high speed coasting, forward clutch C$_1$ can be released by shifting control valve 90, whereby the engine and wheels are disconnected, and higher fuel efficiency is attained.

(h) As port $\epsilon$ which has line pressure applied at R range of manual valve 40, and port $\eta$ which is connected to the brake hydraulic servo during reverse movement, are made on said control valve 90, a reverse condition and malfunction of gears are avoided even though the shift lever is moved to R range while a speed of vehicle is higher than a certain level.

What is claimed is:

1. A hydraulic control system for an automatic transmission including hydraulic servos for clutches and brakes to engage and disengage components in a transmission gear mechanism and having a forward clutch hydraulic servo and a brake hydraulic servo, and a manual valve, comprising:
- a modulator valve for adjusting line pressure to a predetermined modulator pressure;
- a control valve adapted to be shifted in response to signals based on positions of the manual valve and the vehicle running condition;
- a first oil path connected between said control valve and said manual valve as a line pressure oil path;
- said control valve including a first port connecting to the forward clutch hydraulic servo, a second port connected to the brake hydraulic servo for restraining movement of the vehicle, a third port connected to said line pressure first oil path, and a fourth port connected to said modulator valve so that, during a normal vehicle running condition, said control valve is arranged to connect said first and said third ports and to drain said second port, and during stopping and high speed coasting vehicle conditions, said control valve is arranged to connect said first and said fourth ports and to connect said second and third ports;
- a second oil path connected between said control valve and said brake hydraulic servo; and
- a shift valve situated in said second oil path, said shift valve not operating during a low speed vehicle condition, said shift valve being adapted to connect said second oil path when said shift valve shifts to a low speed position and to disconnect said oil path when said shift valve shifts to a high speed position.

2. A hydraulic control system as set forth in claim 1, further comprising a third oil path connected between said control valve and said manual valve, said control valve further including a fifth port connected to said third oil path for applying line pressure to said manual valve when said manual valve is in a reverse position, and a sixth port connected to a second brake hydraulic servo adapted to operate during a vehicle reverse condition, so that when the vehicle running condition is less than a certain speed, said fifth and said sixth ports are connected, and when the vehicle running condiion is greater than said certain speed, said fifth and said sixth ports are disconnected.

3. A hydraulic control system as set forth in claim 1, wherein said modulator valve is an electronically operated throttle valve.

4. A hydraulic control system as set forth in claim 1, wherein said shift valve is adapted to shift into said low speed position so as not to operate during transmission gear shifting from a low first speed range to a higher second speed range, but is adapted to shift into said high speed position so as to operate during transmission gear shifting from said higher second speed range to an even higher third speed range.

* * * * *